United States Patent [19]
Lake, Jr.

[11] Patent Number: 5,150,096
[45] Date of Patent: Sep. 22, 1992

[54] EMERGENCY MAP APPARATUS AND METHOD OF USE THEREOF

[76] Inventor: Samuel H. Lake, Jr., 28503 Winterdale Dr., Canyon Country, Calif. 91351

[21] Appl. No.: 609,639

[22] Filed: Nov. 6, 1990

[51] Int. Cl.[5] .............................................. G08B 1/00
[52] U.S. Cl. ........................ 340/286.14; 340/286.13; 353/12
[58] Field of Search ............... 340/286.14, 286.13, 340/286.02, 990, 995; 40/904; 364/449; 353/12

[56] References Cited

U.S. PATENT DOCUMENTS

| | | | |
|---|---|---|---|
| 2,688,741 | 9/1954 | Saltarelli | 340/286.14 |
| 4,377,049 | 3/1983 | Simon et al. | 340/33 |
| 4,437,085 | 3/1984 | Salant | 340/286.14 |
| 4,528,552 | 7/1985 | Moriyama et al. | 340/286.14 |
| 4,660,037 | 4/1987 | Nakamura | 340/290.14 |

Primary Examiner—Jin F. Ng
Assistant Examiner—Jeffery A. Hofsass
Attorney, Agent, or Firm—Timothy T. Tyson

[57] ABSTRACT

An emergency map apparatus (40) for indicating the most direct route to a destination street is provided. Subsequent to selection of the destination street from a directory (48), those primary and secondary streets forming the most direct route are indicated on a street map (42). A method of use is also provided.

10 Claims, 4 Drawing Sheets

EMERGENCY MAP APPARATUS AND METHOD OF USE THEREOF

TECHNICAL FIELD

The present invention pertains to map indicating apparatus and more particularly, to map apparatus for emergency vehicle use.

BACKGROUND ART

Various map apparatus have been proposed for indicating destination locations. An example is the indication on a map of the location of a store relative to the location of the user of the system, as in a shopping mall. Other map apparatus have been designed to indicate routes and information pertaining to those routes such as for a city bus or subway system.

U.S. Pat. No. 1,637,685 to Cowles uses lights to illuminate selected areas on a map. U.S. Pat. No. 1,655,294 to Robinson indicates business locations that have been selected from a directory. U.S. Pat. No. 1,424,840 to Pardee indicates station routes on a map. U.S. Pat. No. 2,487,318 to Elliot utilizes a traveling column of light cells to indicate destinations on a map. U.S. Pat. No. 2,688,741 to Saltarelli concerns indications of travel routes along with information as to vehicle numbers and transfer requirements.

A need exists in modern cities for emergency vehicles to be informed of direct routes to destinations so that their arrival is expedited. Such vehicles may be fire trucks, emergency ambulances and police cars. The operators of these vehicles are usually familiar with the primary streets servicing their areas but need information as to the most effective secondary street intersections, with these primary streets, to use.

DISCLOSURE OF INVENTION

The present invention is directed to an emergency map apparatus for directing emergency vehicle drivers to a destination. Apparatus in accordance with the invention are characterized by indicators on a street map that, in response to the selection of a destination street, indicate on a primary street, those secondary street intersections providing the most direct route to the destination street.

In a preferred embodiment the indicators are colored lights with one color for the destination street and a different color for the intersections. The indicators are light bulbs. Switches corresponding to street names on a directory are used for the selection of the destination street. A wiring network connects the switches to the proper indicators. In another preferred embodiment the wiring network is replaced by a read only memory, the indicators are light emitting diodes and capacitance touch only switches are employed. A method of use is also provided.

The novel features of the invention are set forth with particularity in the appended claims. The invention will be best understood from the following description when read in conjunction with the accompanying drawings.

BRIEF DESCRIPTION OF THE DRAWINGS

Incorporated as part of the description, in order to illustrate embodiments and principles of the present invention, are the accompanying drawings, wherein.

MODES FOR CARRYING OUT THE INVENTION

Figure 1:
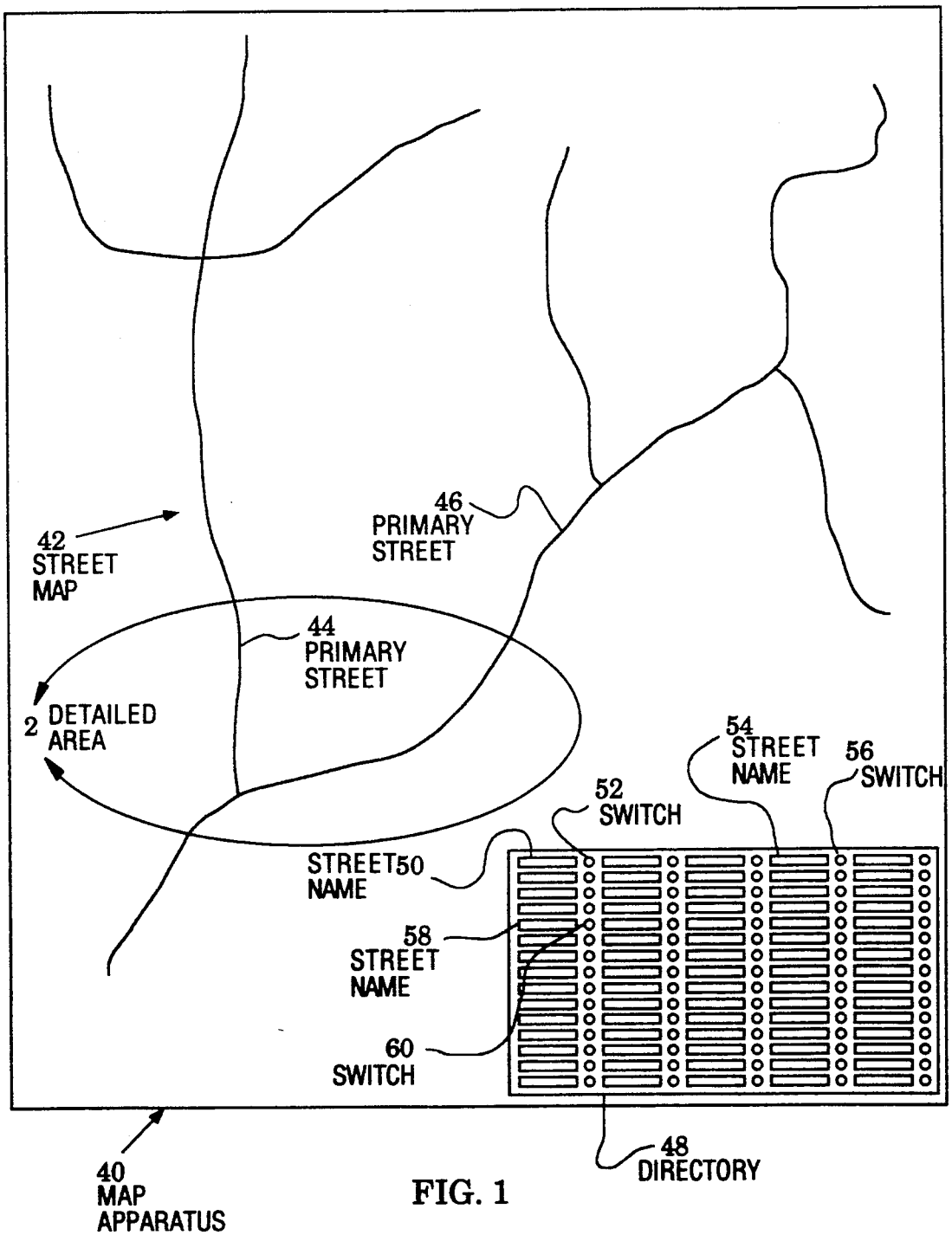
FIG. 1 is a plan view, in accordance with an embodiment of the present invention, of a street map apparatus.

FIG. 1 is a plan view, in accordance with an embodiment of the current invention, of an emergency map apparatus 40. The map apparatus has a street map 42 representing, in addition to other streets, the primary streets such as the primary streets 44, 46. A directory 48 has street names and associated electrical switches of which the street name 50 and associated switch 52 are typical. From the street names a first destination street name 54 can be selected by activating the associated switch 56.

Figure 2:
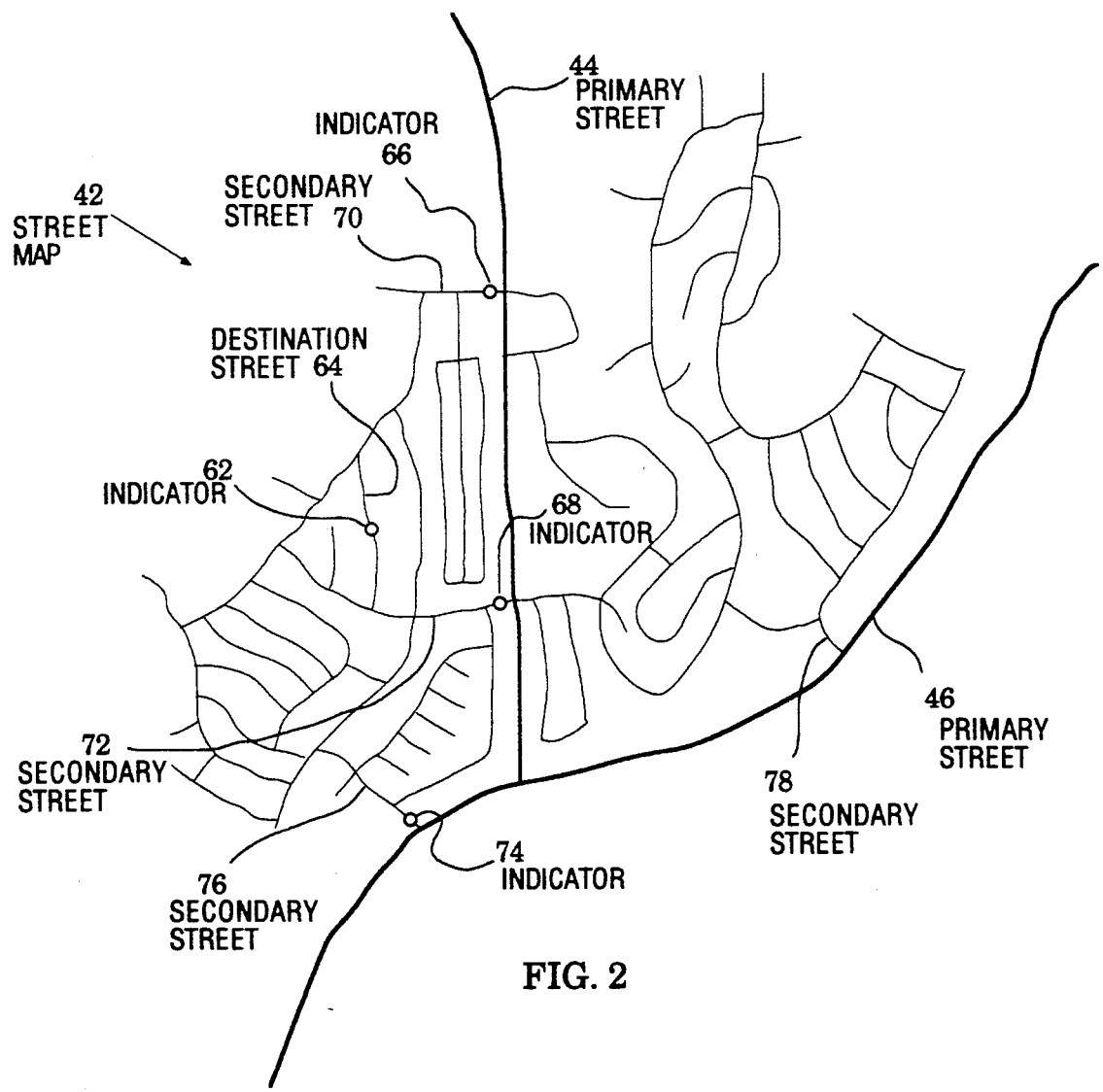
FIG. 2 is an enlarged view of the area enclosed by the line 2 of FIG. 1.

FIG. 2 is an enlarged view of the area enclosed by the line 2 of FIG. 1 illustrating secondary and neighborhood streets served by the primary streets 44, 46. In response to the activation of the switch 56 on the directory 48 (FIG. 1) an indicator 62 is energized so that the destination street 64, corresponding to the street name 54 on the directory 48, is clearly indicated on the map 42. Activating switch 56 also causes indicators 66, 68 to be energized. The indicators 66, 68 represent intersections of secondary streets 70, 72 with the primary street 44.

The secondary streets 70, 72 are those secondary streets intersecting the primary street 44 that, of all secondary streets intersecting the primary street 44, form the most direct route from the primary street 44 to the destination street 64. The secondary streets 70, 72 are the preferred secondary streets. Most direct would usually be interpreted to be least driving time although that interpretation might be modified by other local factors such as presence of schools or hospitals, location of fire hydrants and the like.

Also energized by activation of the switch 56 is the indicator 74 which represents the intersection of secondary street 76 with the primary street 46. The secondary street 76 is the most direct route, of all secondary streets intersecting the primary street 46, to the destination street 64. The secondary street 76 is the preferred secondary street.

In the embodiment 40 of the emergency street apparatus the indicator 62 is a light illuminated in the color red while the indicators 66, 68 and 74 are illuminated in yellow. Thus at a glance an observer of the map apparatus 40 would see that the most direct travel route to the destination street 64 involves the use of one or more of the primary streets 44, 46 and secondary streets 70, 72 and 76. This information may be communicated to those requiring it such as the drivers of fire trucks, emergency vehicles and police cars. They could observe the information directly or it could be relayed to them over car phones or two way radios. In the embodiment 40 the primary streets such as primary streets 44, 46 are indicated in a bolder line as in FIGS. 2, 3 to further distinguish the intersections with those secondary streets offering the most direct routes to selected destination streets.

The final choice of streets taken to the destination street 64 would depend on where the emergency vehicle was at the time the information was made available. A vehicle on the primary street 44 and approaching the street 70 from the top of the map 42 would probably use the intersection indicated by the indicator 66 while a vehicle on the primary street 46 and approaching the intersection with the primary street 44 from the right side of the map 42 would have a choice of using the intersections indicated by the indicators 68, 74. This information would avoid, for instance, the inadvertent use, chosen in error under the pressure of the moment, of the secondary street 78 which would delay arrival at the destination street 64.

Figure 3:
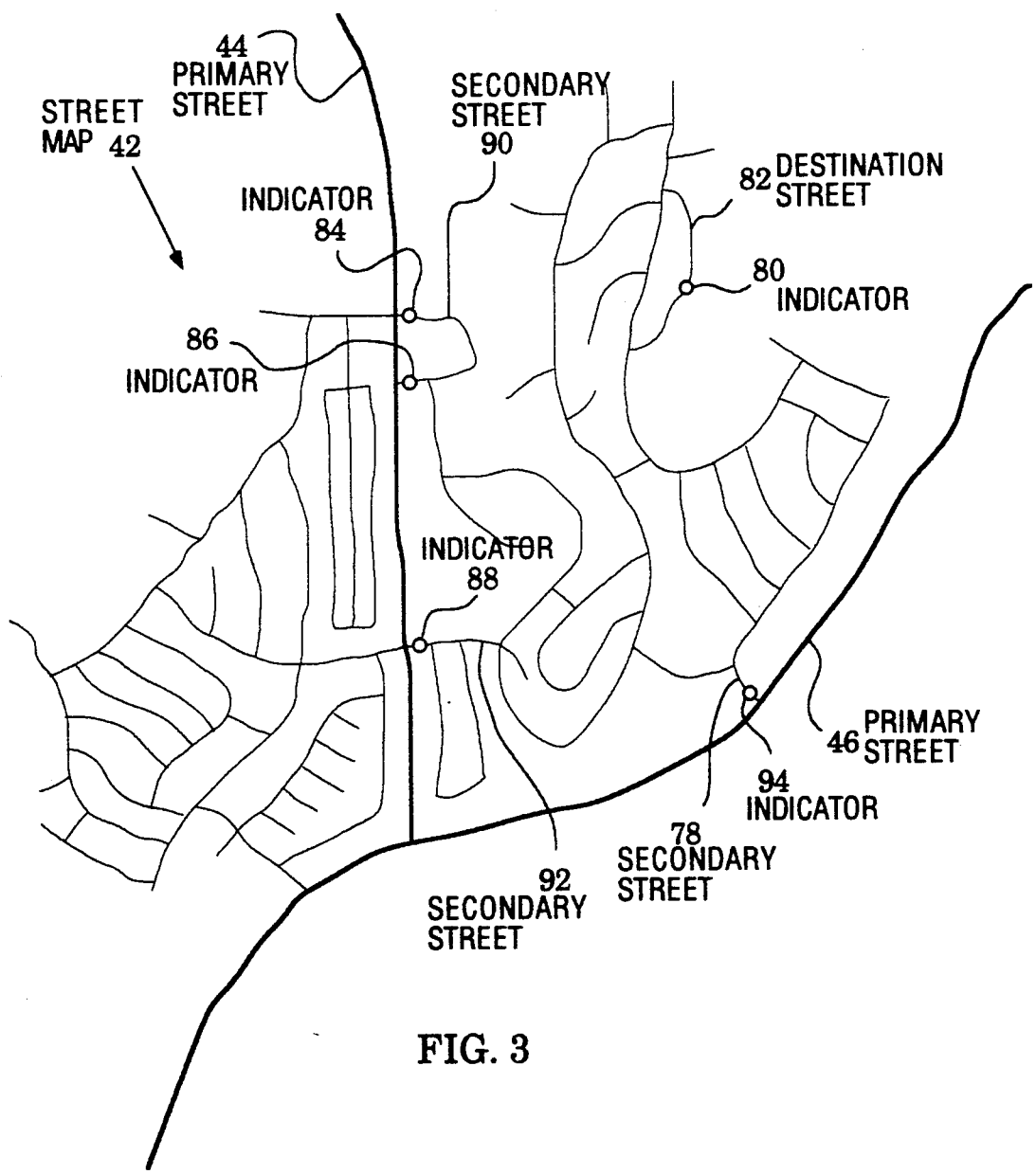
FIG. 3 is a view similar to FIG. 2.

FIG. 3 is a view similar to FIG. 2 illustrating, in a second example, what happens in the map apparatus 40 when the street name 58 of the directory 48 (FIG. 1) is selected with the switch 60. The indicator 80 is energized and emits red light representing the destination street 82 corresponding to the street name 58. Also the indicators 84, 86 and 88 are energized and each emits yellow light representing intersections with the primary street 44 of the most direct secondary streets 90, 92 to the destination street 82 from the primary street 44. The indicator 94 is also energized and emits yellow light representing the intersection of the secondary street 78 which is the most direct secondary street from the primary street 46 to the destination street 82.

Figure 4A:
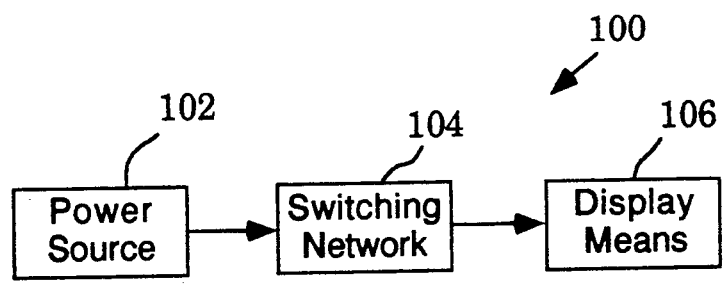
FIG. 4A illustrates an electrical block diagram of the apparatus of FIG. 1.
Figure 4B:
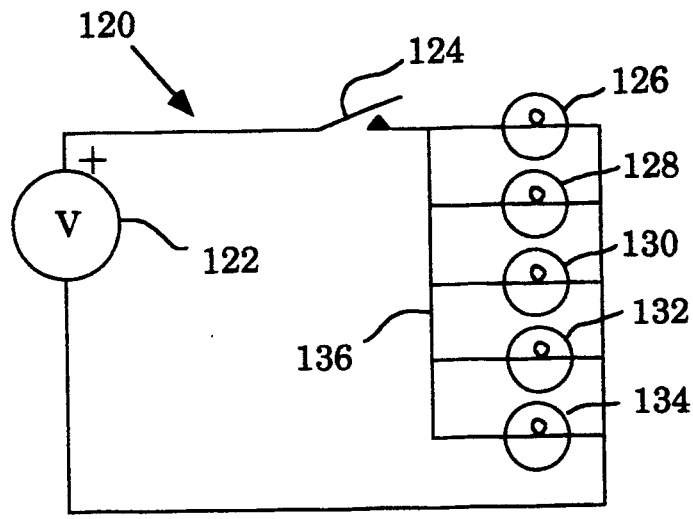
FIG. 4B illustrates a partial schematic of the apparatus of FIG. 1.

FIG. 4A is a block diagram of a network 100, for the map apparatus 40, having a power source 102, a switching network 104 and display means 106. The switches 56, 60 discussed above and shown in FIG. 1 are part of the switching network 104 while the indicators 62, 66, 68, 74, 80, 84, 86, 88 and 94 are part of the display means 106. FIG. 4B illustrates a partial circuit diagram 120 demonstrating one selection switch 124 enabling, through a voltage source 122 and a wiring network 136 (part of the switching network 104), a destination indicator 126, two intersection indicators 128, 130 for a primary street and two intersection indicators 132, 134 for a second primary street. The indicator 126 is similar in function to the indicator 62 in FIG. 2, the indicators 128, 130 are similar in function to the indicators 66, 68 in FIG. 2 and the indicators 132, 134 are similar in function to the indicator 74 in FIG. 2. Various types of electrical switches may be used for the switches typified by the switch 124 including touch only capacitance switches.

Figure 4C:
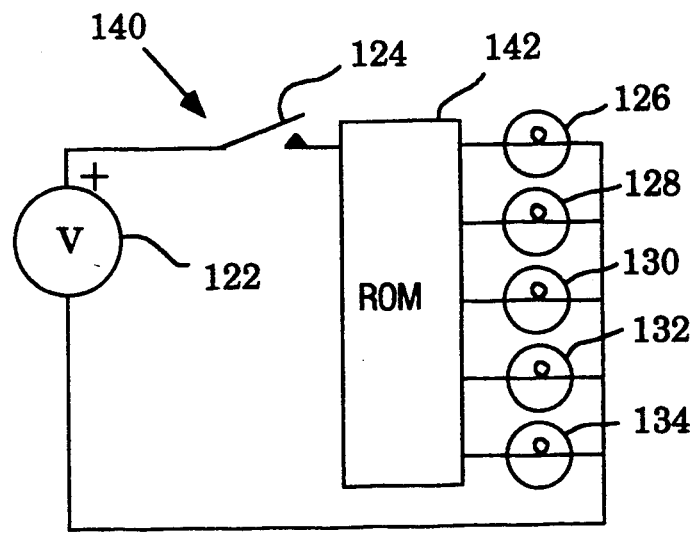
FIG. 4C illustrates, in accordance with another preferred embodiment of the current invention, another partial schematic.

FIG. 4C illustrates, in accordance with another preferred embodiment of the current invention, a partial schematic 140 in which the wiring network 136 of the schematic 120 is replaced by a read only memory (ROM) 142. The indicators 126 through 134 are red and yellow light bulbs in the embodiment 40 described in FIGS. 1-4 but may also be light emitting diodes.

Thus an emergency map apparatus has been provided that indicates, once a destination street has been selected, those intersections of one or more primary streets with secondary streets to use in order to most quickly arrive at the destination street. The present invention has been described with reference to preferred embodiments and it is apparent that numerous modifications and rearrangements of these embodiments can be made with the equivalent result still embraced within the scope of the invention.

What is claimed is:

1. Map apparatus, comprising:
    a street map denoting neighborhood streets, secondary streets and primary streets;
    means for selecting, from said neighborhood streets, a destination street;
    first means responsive to said selecting means for indicating said destination street on said map; and
    second means, responsive to said selecting means, for indicating on said map, for each of said primary streets, intersections with preferred secondary streets;
    wherein said preferred secondary streets initiate a more direct route from said each of said primary streets to said destination street than other of said secondary streets;
    the map apparatus being capable of indicating more than one intersection to provide alternative routes to said destination street; and
    emergency vehicles thereby informed of said intersections initiating the most direct route from each of said primary streets to said destination street.

2. Map apparatus as defined in claim 1 wherein said first and second indicating means each comprise light bulbs.

3. Map apparatus as defined in claim 1 wherein said first and second indicating means each comprise light emitting diodes.

4. Map apparatus as defined in claim 1 wherein said first and second indicating means each comprise colors to differentiate said first and second indicating means.

5. Map apparatus as defined in claim 1 wherein said selecting means comprises a plurality of electrical switches.

6. Map apparatus as defined in claim 5 wherein said electrical switches comprise capacitance switches.

7. Map apparatus as defined in claim 1 wherein said first indicating means comprises:
    a power source;
    a plurality of switches; and
    first means, located on said map and connected to said power source with corresponding ones of said plurality of switches, for lighting;
    and wherein said second indicating means comprises:
    second means, located on said map and connected to said power source with corresponding ones of said plurality of switches, for lighting.

8. Map apparatus as defined in claim 1 wherein said first indicating means comprises:
    a power source;
    a plurality of switches;
    a read only memory; and
    first means, located on said map and connected to said power source with corresponding ones of said plurality of switches and said read only memory, for lighting;
    and wherein said second indicating means comprises:
    second means, located on said map and connected to said power source with corresponding ones of said plurality of switches and said read only memory, for lighting.

9. A method of directing emergency vehicles, comprising the steps of:
    selecting form a directory of neighborhood streets on an emergency map apparatus, a destination street;
    activating an electrical switch on said map apparatus corresponding to said destination street;
    observing a first indicating means, energized by said switch, on a street map on said map apparatus illustrating neighborhood streets, secondary streets and primary streets wherein said destination street is indicated by said first indicating means; and observing a second indicating means, energized by said switch on said street map indicating intersections with each of said primary streets on said street map of preferred secondary streets wherein said preferred secondary streets initiate a more direct route from said each of said primary streets to said destination street than other secondary streets of said street map; and where the map apparatus is able to indicate more than one intersection to provide alternative routes to said destination street; and utilizing information provided by said first and second indicating means to direct emergency vehicles via said intersections to said destination street.

10. Map apparatus as defined in claim 1 wherein said selecting means comprises a directory of street names.

* * * * *